US012800931B2

(12) United States Patent
Volkov

(10) Patent No.: US 12,800,931 B2
(45) Date of Patent: Nov. 17, 2026

(54) HOLOGRAPHIC DEVICE

(71) Applicant: TRULIFE OPTICS LIMITED, London (GB)

(72) Inventor: Andrii Volkov, London (GB)

(73) Assignee: TRULIFE OPTICS LIMITED, London (GB)

( * ) Notice: Subject to any disclaimer, the term of this patent is extended or adjusted under 35 U.S.C. 154(b) by 294 days.

(21) Appl. No.: 18/696,773

(22) PCT Filed: Sep. 14, 2022

(86) PCT No.: PCT/EP2022/075562
§ 371 (c)(1),
(2) Date: Mar. 28, 2024

(87) PCT Pub. No.: WO2023/052131
PCT Pub. Date: Apr. 6, 2023

(65) Prior Publication Data

US 2024/0402496 A1 Dec. 5, 2024

(30) Foreign Application Priority Data

Sep. 28, 2021 (GB) ..................................... 2113846

(51) Int. Cl.
*G02B 27/01* (2006.01)

(52) U.S. Cl.
CPC .. *G02B 27/0172* (2013.01); *G02B 2027/0107* (2013.01); *G02B 2027/0109* (2013.01); *G02B 2027/0174* (2013.01)

(58) Field of Classification Search
CPC ............ G02B 27/0172; G02B 27/0025; G02B 27/0093; G02B 2027/0107;
(Continued)

(56) References Cited

U.S. PATENT DOCUMENTS

2004/0108971 A1* 6/2004 Waldern ............... G02B 27/017 345/8
2011/0194163 A1* 8/2011 Shimizu ............. G02B 27/0172 359/15
(Continued)

FOREIGN PATENT DOCUMENTS

EP 0 574 005 A2 12/1993
EP 3 002 624 A1 4/2016
(Continued)

OTHER PUBLICATIONS

International Search Report dated Jan. 18, 2023 from corresponding International Patent Application No. PCT/EP2022/075562, 5 pages.
(Continued)

*Primary Examiner* — William R Alexander

(74) *Attorney, Agent, or Firm* — Ruggiero McAllister & McMahon LLC

(57) ABSTRACT

A holographic device and method of forming a holographic device for a virtual retinal display, the holographic device including: a transparent substrate; and a holographic element arranged on said substrate; the holographic element includes a phase pattern and said phase pattern is a predefined optical coma configured and arranged to diffract light from a light source to form a plurality of images at an image plane of the holographic element. A virtual retinal display including a holographic device. An augmented reality system including a virtual retinal device and a pair of smart glasses.

16 Claims, 7 Drawing Sheets

(58) Field of Classification Search
CPC .... G02B 2027/0109; G02B 2027/0174; G02B 2027/011; G02B 2027/0145; G02B 2027/0105; G02B 5/32; G02B 26/10; G03H 2270/55; G03H 1/00; G06F 3/011
USPC ........................................................ 359/13
See application file for complete search history.

(56) References Cited

U.S. PATENT DOCUMENTS

| | | | | |
|---|---|---|---|---|
| 2019/0041565 | A1 | 2/2019 | Masson | |
| 2021/0356745 | A1* | 11/2021 | Graf | G02B 27/0172 |
| 2022/0365482 | A1* | 11/2022 | Yu | G03H 1/0248 |
| 2024/0094531 | A1* | 3/2024 | Liu | G02B 27/0025 |

FOREIGN PATENT DOCUMENTS

| | | | |
|---|---|---|---|
| WO | 2014/155288 | A2 | 10/2014 |
| WO | 2020/120297 | A1 | 6/2020 |

OTHER PUBLICATIONS

Written Opinion dated Jan. 18, 2023 from corresponding International Patent Application No. PCT/EP2022/075562, 7 pages.

* cited by examiner

Fig. 4a
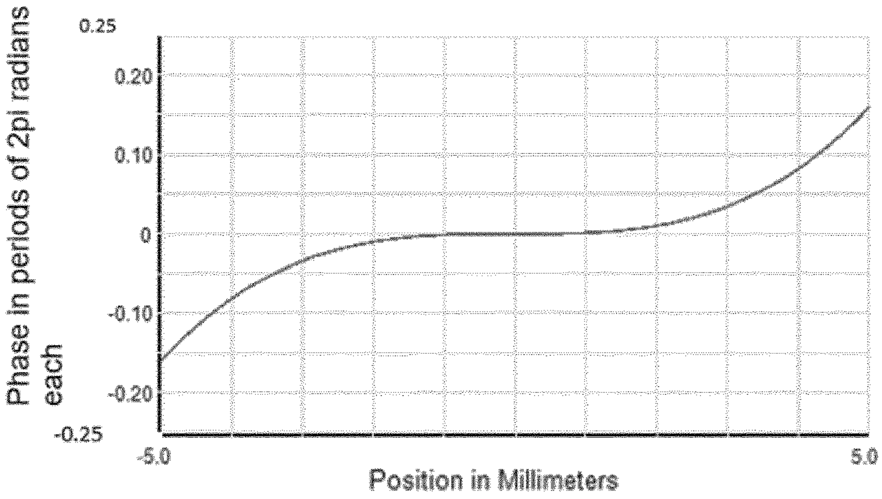
Fig. 4b
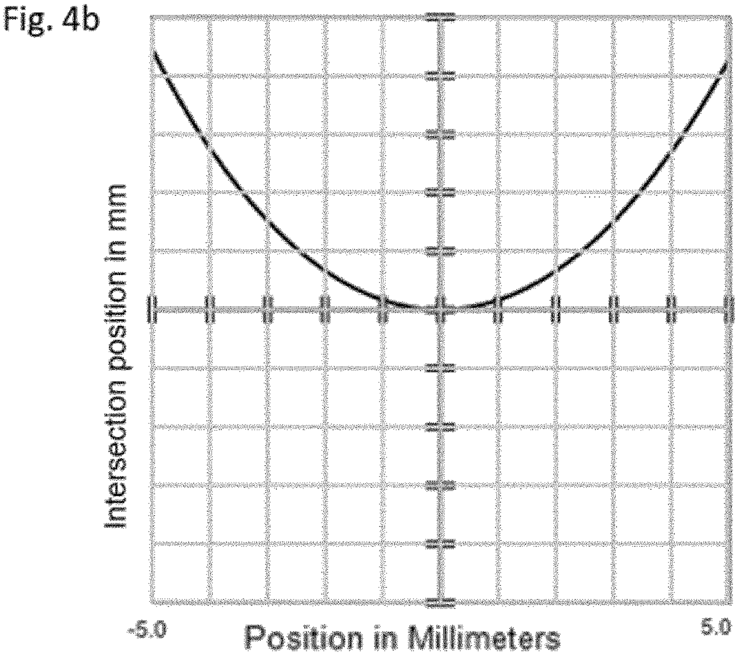
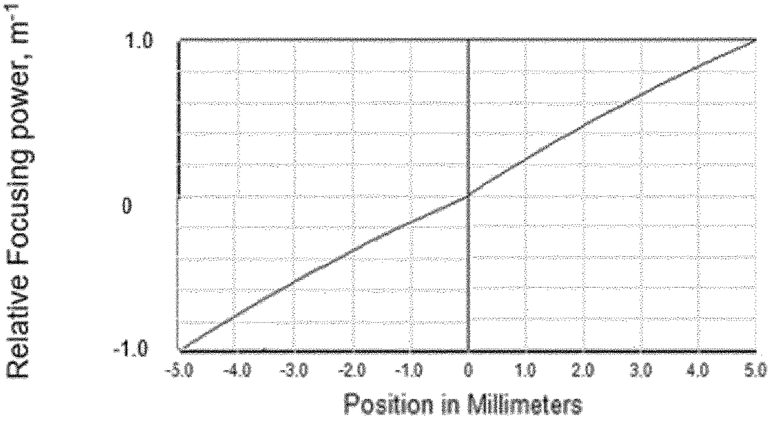
Fig. 4c

HOLOGRAPHIC DEVICE

CROSS-REFERENCE TO RELATED APPLICATIONS

This application is a national stage application, filed under 35 U.S.C. § 371, of International Patent Application No. PCT/EP2022/075562, filed on Sep. 14, 2022, which claims priority to United Kingdom Patent Application No. 2113846.6, filed on Sep. 28, 2021, the entire contents of each of which is incorporated by reference herein in its entirety.

BACKGROUND

1. Field of the Disclosure

The present disclosure relates to a holographic device and a method of forming a holographic device. The present disclosure also relates to a virtual retinal display comprising a holographic device. The disclosure also relates to an augmented reality display system comprising a virtual retinal display. Yet further the present disclosure relates to an augmented reality display system comprising the holographic device wherein the augmented reality display is a pair of smart glasses.

2. Description of the Related Art

A virtual retinal display (VRD) system, also known as a Retinal Scan Display (RSD) system or more simply a Retinal Projector (RP) system, is a display technology that rapidly scans or rasters a display image via an optical system onto the retina of a user's eye. VRD systems, enable users to see what appears to be a conventional display floating in their field of view in front of them. Such VRD systems are currently incorporated into so-called smart glasses to enable augmented reality where a virtual image is displayed to a user wearing the smart glasses.

An example of a typical VRD system 100 is shown in FIG. 1. The VRD system of FIG. 1 comprises a light source 102, which can typically be a low power RGB (red, green, blue) light sources such as lasers or laser diodes. Such VRD systems 100 typically comprises first and second micro-electromechanical (MEMS) scanning mirrors, the first scanning mirror acts as a raster line scanner, scanning at a rate of several KHz. The second scanning mirror acts as a frame refresh scanner arranged to scan at a rate of approximately 60 Hz. The first and second micro-electromechanical (MEMS) scanning mirrors may be replaced by a single MEMS tip-tilt mirror 104 which is capable of simultaneous raster line and frame refresh scanning at the desired rates. The light source 102, MEMS scanning mirrors 104 and lens 106 are collectively known as a projector system 110. An image from the light source is directed onto a holographic optical element (HOE) 108 by the tip-tilt mirror 104 and lens 106. The image, scanned or rastered by the scanner 104, is focused on a surface P, by the lens 106 where the surface P is intermediate between the lens 106 and the HOE 108. The intermediate surface P is normal to the projector system 110 axis A-A. VRD systems of the type described above typically use so-called holographic optical elements (HOEs) to re-converge light from the projector system 110 at a user's eye. The HOEs used for this purpose are known as point-to-point HOEs and they take light from the exit pupil of the projector system 110 and converge it onto a small point known as an eye-box. Light arriving at the eye-box is required to be substantially or nearly collimated so that when in use, a user can see sharp (resolved) images. In the context of holographic optical elements, the eye-box position is that from which the entire image produced by the VRD is visible to a user.

It is known however, that such VRD arrangements suffer from image resolution problems. As shown schematically in FIG. 2*a* light from the projector system 110 at the intermediate focal plane P, is not optimally focused, in that ray bundles P1 and P3 from the projector system 110 appear blurred. As shown in FIG. 2*b*, the holographic optical element 108 reflects the ray bundles onto the eye-box such that only on-axis points, P2 in this example, will be in focus at the eye-box. The intermediate surface P is normal to the projector system 110 axis A-A. Disadvantageously, the off-axis points, P1 and P3 in this example, which correspond to points at the periphery of the image will appear blurred at the eye plane of a user. The blurred off-axis ray bundles are diffracted by the holographic optical element to the user resulting in a blurred image. Typically, one of P1 or P3 will be under focused, whereas the other will be over focused. Whilst FIGS. 2*a* and 2*b* show three idealised ray bundles P1, P2 and P3, the skilled person will appreciate that in practice there are infinite ray bundles across the 2-dimensional image plane, with the central on-axis ray bundle, P2 appearing in focus. The central on-axis ray bundle corresponds to the central optical axis of the projector system 110. The holographic optical element 108 is known as a point-to-point hologram in that it results in the formation of a single eye-box which appears to the user as a uniform image spot. Typically, the spot will have dimensions of 1 $mm^2$ at the eye plane.

As shown in FIG. 2*b*, the spot 1 is under focused (because rays are converging) and is perceived to be too close, whereas spot 3 is over focused and cannot be perceived or accommodated by a user (because it is converging beyond infinity), causing images to appear blurred. As discussed above, spot 2 will be in focus.

The types of point-to-point holographic optical element as described above are designed to produce a single eye-box. The attractiveness of using point-to-point hologram to create an array of small eye-boxes is that when it comes to superposition, that is blending or coordinating, of images coming through viewers pupil, it is easy for eye tracking algorithms to select rays from the field-of-view which are seen or not seen by the viewer. However, point-to-point holographic optical elements do suffer from the resolution problems as mentioned.

SUMMARY

Various example embodiments are directed to issues such as those addressed above and/or others which may become apparent from the following disclosure. The purpose and advantages of the illustrated embodiments are described below.

The present disclosure relates generally to a holographic device that overcomes issues of image resolution associated with known point to point type holographic optical elements.

According to embodiments there is provided therefore a holographic device for a virtual retinal display, the holographic device comprising: a substrate; and a holographic element arranged on said substrate; wherein the holographic element comprises a phase pattern and said phase pattern contains a predefined optical coma configured and arranged to diffract light from a light source to generate an eye box at an eye plane of the holographic element. The eye box may be a coma aberrated image of said light source.

The optical coma of said holographic element may be configured and arranged to form an array of eye boxes at said eye plane and the array of discrete eye boxes may be a two-dimensional array of eye-boxes at said eye plane. The optical coma may be represented as cubic function in the phase profile across a transverse axis of the holographic element, wherein said transverse axis may extends through a central portion of the holographic element between first and second distal edges of said holographic element. The optical coma may increase from the central portion of the holographic element toward said first and second distal sides of said holographic element and wherein said optical coma is anti-symmetrical about a central axis. A local optical focusing power of the holographic element may increase from the central portion of said holographic element towards the first side; and the local focusing power decreases from the centre portion towards the second side. The local optical focusing power of the holographic element may be substantially zero at the central portion and wherein the local optical focusing power varies substantially linearly across the width of the holographic element. The eye plane may be orientated normally with respect to a central ray of said light source from the central portion of the holographic element.

According to embodiments there is also provided a method of forming a holographic device for a virtual retinal display system, the method comprising: forming a holographic element on a substrate; wherein the holographic element comprises a phase pattern and said phase pattern contains a predefined optical coma configured and arranged to diffract light from a light source to generate an eye box at an eye plane of the holographic element, and said eye box is a coma aberrated image of said light source.

There is also provided a virtual retinal display system comprising a holographic device according to embodiments. The virtual retinal display may further comprising a projector system, wherein the projector system comprises a light source and one or more scanning mirrors configured an arranged to direct light from said light source to said holographic device. The holographic device may be configured and arranged to diffract light from said projector system to said eye plane, wherein said eye plane corresponds in location to a pupil of a user's eye. Said light source may be an RGB laser and said one or more scanning mirrors are micro-electromechanical (MEMS) scanning mirrors. The virtual retinal display may further comprising an eye tracking system, wherein the eye tracking system is configured and arranged to select one or more of the discrete eye boxes of the two-dimensional array.

There is also provided an augmented reality system, comprising such a virtual retinal display system according to embodiments and a pair of smart glasses.

Advantageously, uniform resolution throughout the image is achieved by using the holographic device according to embodiments to achieve a uniform focus on a plane at the eye. This results in an improvement of image resolution compared to known VRD systems by introducing pupil aberrations in the form of a predefined optical coma.

BRIEF DESCRIPTION OF THE DRAWINGS

So that the manner in which the features of the present disclosure can be understood in detail, a more particular description is made with reference to embodiments, some of which are illustrated in the appended figures. It is to be noted, however, that the appended figures illustrate only typical embodiments and are therefore not to be considered limiting of its scope. The figures are for facilitating an understanding of the disclosure and thus are not necessarily drawn to scale. Advantages of the subject matter claimed will become apparent to those skilled in the art upon reading this description in conjunction with the accompanying figures, in which like reference numerals have been used to designate like elements, and in which:

FIG. 4*a* illustrates a graph of relative phase profile of a holographic device according to embodiments.

FIG. 4*b* illustrates a graph of parabolic ray intersection profile of the holographic device according to embodiments.

FIG. 4*c* illustrates a graph of substantially near linear focusing power profile of the holographic device according to embodiments.

DETAILED DESCRIPTION

Figure 1:
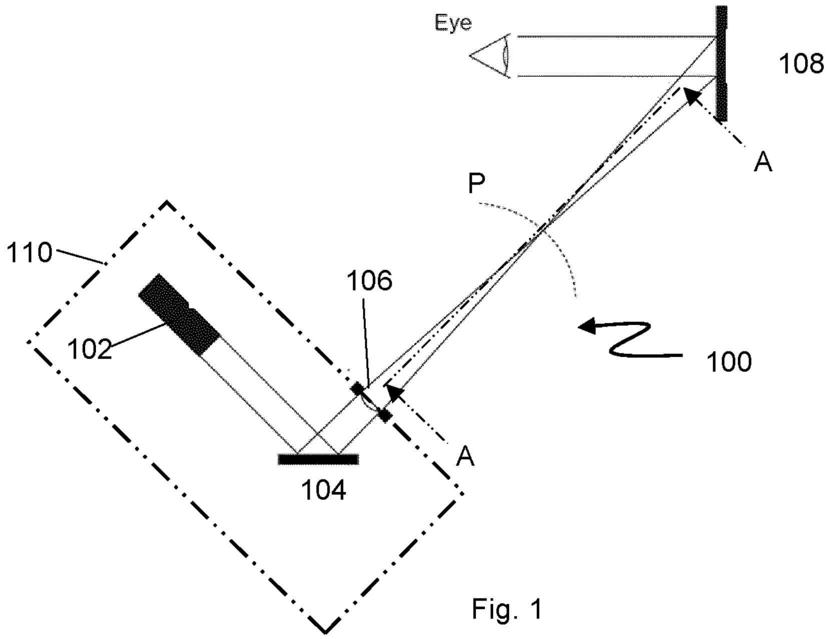
FIG. 1 shows a known virtual retinal display system comprising a projector system and a point-to-point holographic optical element.
Figure 2A:
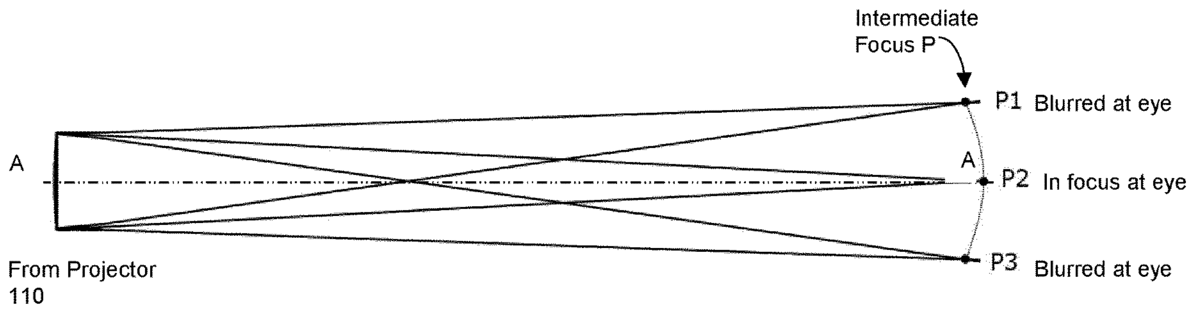
FIG. 2*a* shows a ray diagram from the exit pupil of the projector system of FIG. 1.
Figure 2B:
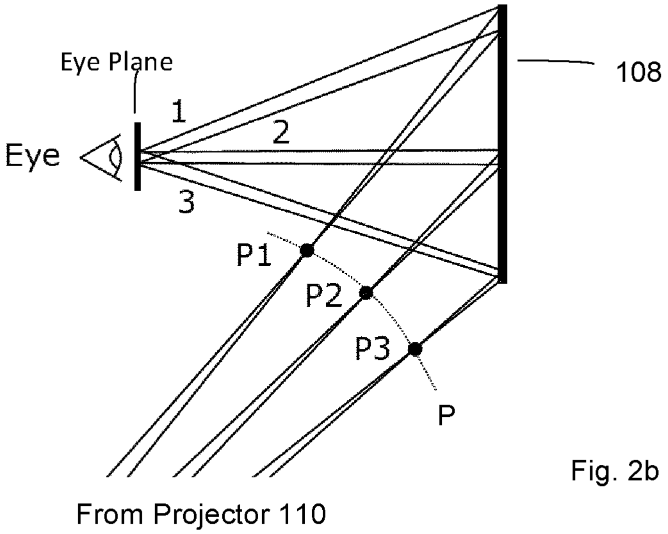
FIG. 2*b* shows a ray diagram of a known point-to-point holographic element.
Figure 3A:
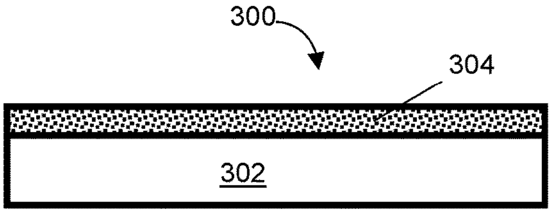
FIG. 3*a* illustrates a schematic side view of a holographic device according to embodiments.
Figure 3B:
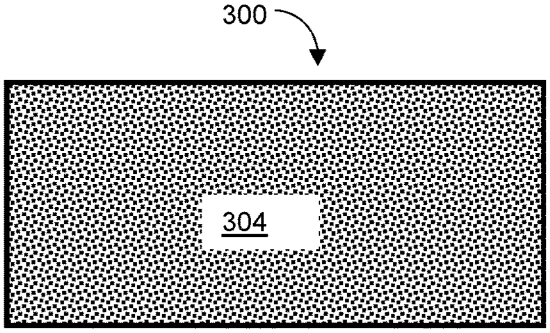
FIG. 3*b* illustrates a schematic top view of a holographic device according to embodiments.

In overview and referring to FIG. 3*a*, a holographic device 300 comprises a substrate or plate 302 onto which a hologram element 304 is formed. The substrate or plate 302 can be formed from any appropriate optical material such as for example glass, polycarbonate plastic or acrylic plastic and may comprises a single unitary piece of optical material, or may be formed by two or more layers of optical material. The substrate 302 may be substantially flat or planar and may be transparent. Alternatively, the substrate 302 may be curved, where the curvature of the substrate follows for example the curvature of a lens. The holographic pattern or interference pattern making up the hologram element 304 is illustrated in FIG. 3*b*, which shows a diffractive structure formed using the appropriate holographic material on the substrate 302. The hologram element 304 may be a reflection type hologram.

Advantageously, the hologram element 304 of the holographic device 300 according to embodiments incorporates a predefined phase pattern in order to achieve improved resolution. Depending on the specific application and the limitations of the VRD, the holographic device 300 when used with a VRD can improve the resolution of the image by for example a factor of up to 2 times. For example, the holographic device 300 may achieve at least 10-line pairs per degree which is uniform across the field of view. This is compared with known point to point holographic optical elements which may result in 5-line pairs per degree.

The phase pattern of the hologram element 304 is recorded in the interference pattern making up the hologram element 304. Contrary to known approaches, the phase pattern introduces a coma aberration into the hologram element 304. Comas may arise in certain optical systems due to for example misalignment in optical components and are unwanted because they result in blurred images. However, according to embodiments of the present disclosure, a predefined phase pattern in the form of a coma is deliberately introduced to achieve the improved resolution. The inventive concept of the present disclosure is a coma which can be characterised as a substantially cubic term addition in the phase profile across the hologram element 304 and more specifically the transverse lateral direction (that is the horizontal direction across the plane of the hologram when viewing FIG. 3*b*) across the substrate in the direction of the plane comprising a viewer's eye and a projector system of a VRD system as discussed below.

The phase profile according to embodiments can be seen in FIG. 4*a*, which illustrates how the phase profile varies cubically across the holographic device 300 which has a width of 10 mm (−5 mm to 5 mm) in this example. In this context phase is the difference in phase lag across a wavefront and can be described as an addition or subtraction to the phase of the incident wavefront. In general, the holographic device 300 modifies the curvature of light wavefronts of the light diffracted by the holographic element in accordance with the predefined phase profile. The x axis (horizontal or abscissa) of FIG. 4*a* represents the transverse width of the hologram as mentioned above, and the y axis (vertical or ordinate) of FIG. 4*a* represents the phase in periods of 2π radians. As the skilled person will appreciate, the cubic term results in a phase profile which in relative terms is high at the edges of the holographic device 300 and which in relative terms decreases in accordance with the cubic term towards the origin of the graph (or the centre of the holographic optical element). In other words, the phase decreases in relative terms, towards the centre of the holographic device 300, thus defining an anti-symmetrical phase profile. The phase profile corresponding to the coordinate in the transverse direction across the holographic device 300 is given by the function:

$$\text{Phase} \propto x^3$$

where x is the coordinate in the transverse direction across the holographic device 300

Figure 5A:
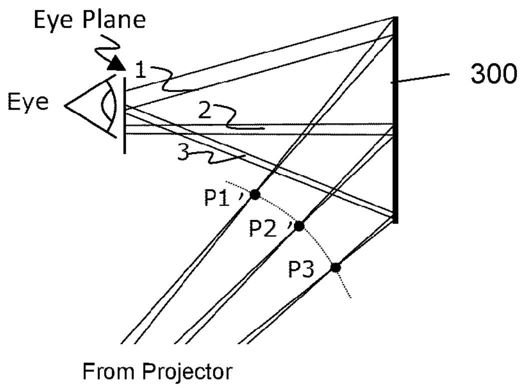
FIG. 5*a* illustrates a schematic ray diagram of light diffracted from the holographic device according to embodiments to an eye plane.
Figure 5B:
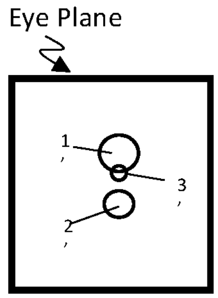
FIG. 5*b* illustrates schematically the light as diffracted from the holographic device to an eye plane, according to embodiments.

FIG. 4*a* illustrates the phase relative to a similar sized point-to-point hologram. That is, the point-to-point hologram will have a known phase profile and that FIG. 4*a* shows the difference between a known phase profile and the additional predetermined phase profile of the holographic device. Known phase profiles of point-to-point holographic elements do not include a predefined coma for aberrating the exit pupil to intentionally spread the eye box as illustrated in FIGS. 5*a* and 5*b*).

On the right-hand side of FIG. 4*a*, that is for the positive going phase profile, the hologram element 304 of the holographic device 300 adds locally to the curvature of any wavefronts incident thereon. Whereas on the left-hand side of FIG. 4*a*, that is for the negative going profile, the hologram element 304 subtracts from the curvature of the any wavefronts incident thereon. Any wavefronts incident on at the origin will undergo no substantial change in curvature.

FIG. 4*b* illustrates the parabolic nature of ray intersections at the eye plane. In the context of the present disclosure, the eye plane of the holographic device 300 is considered to occur at or near a user's pupil. The skilled person will see that the graph of FIG. 4*b* is based on a first derivative of the phase profile of FIG. 4*a*, which illustrates the transverse distance across the holographic device 300 on the x axis and the coordinate of the point of intersection with the eye plane on the y axis. FIG. 4*a* shows that the wavefronts diffracted from the holographic device 300 will be locally tilted and therefore displaced in the eye plane in accordance with the parabolic function as illustrated in FIG. 4*b*. The amount of tilt at any point will be equal to the slope of the graph in FIG. 4*a* at that point of the holographic element. At the origin there will be no deviation in the amount of at the point of intersection at the eye plane (as with known point to point holographic optical elements). However, as light is incident on the holographic device 300 away from the origin, the point of the intersection at the eye plane of diffracted light will also move away from the central on axis position on the eye plane (as shown in FIGS. 5*a* and 5*b* below).

With this cubic phase profile in mind, and looking at FIG. 4*c*, the skilled person will see therefore that light incident on the centre of the holographic optical element will undergo zero, or very little focal shift. Similarly, light incident on the holographic device 300 away from the centre will undergo focal shift and this change will increase substantially linearly resulting in focal plane tilt as discussed below.

FIG. 4*c* illustrates the near or substantially linear nature of the relative focusing power (dioptres ($m^{-1}$)) of the holographic optical element in a transverse direction across the holographic device 300. The skilled person will see that the graph of FIG. 4*c* is based on the second derivative of the phase profile of FIG. 4*a*, and the first derivative of FIG. 4*b*. FIG. 4*c* illustrates the transverse distance across the holographic device 300 on the x axis and corresponding focusing power on the y axis. The focusing power of the holographic device 300 is zero at the origin and increases linearly and positively from the centre to the right-hand side thereof. Similarly, the focusing power of the holographic device 300 decreases linearly from the centre to the left-hand side thereof. This has the effect of tilting the focal plane of the holographic device 300. The skilled person will see therefore that the optical power across the device 300 varies nearly substantially linearly. The tilting of the focal plane increases the curvature of the wavefront of light incident on one side of the holographic device 300 and decreases the curvature of the wavefront of light incident on the other, opposite side.

In this regard the skilled person will appreciate that in order to implement the present invention, the hologram element 304 of the holographic device 300 should have an additional coma contribution in the form of a cubic phase profile. The effect of the coma in the holographic device 300 is to vary the optical power proportional to the distance from the origin of the holographic element 304.

Further performance improvements will be derived from optimising the phase function in other directions, such as the orthogonal direction to the transverse horizontal direction, mentioned above, along the hologram element surface. The above-described embodiment describes the situation where the phase profile of FIG. 4*a* (and subsequent derivatives thereof shown in FIGS. 4*b* and 4*c*) varies across the holographic device 300 (looking left to right across FIG. 3*b*). The skilled person will however appreciate that the phase profile of FIG. 4*a* may be implemented in any appropriate orientation across the holographic device 300 without deviating from the inventive concept. For example, the phase profile may be defined along the orthogonal direction, mentioned above, down (as viewed in FIG. 3*b*) the holographic device 300, or any appropriate orientation provided that the plane of the exit pupil of a projector is normal to a major surface of the holographic device 300 on which the hologram element 304 is arranged.

How light is diffracted from the holographic device 300 will be more clearly understood with reference to FIG. 5*a* which illustrates an idealised view of how three light ray bundles, at points P1', P2' and P3' on intermediate focal surface P' from a projector system are diffracted. Whilst FIG. 5*a* shows three light ray bundles the skilled person will appreciate that the number of ray bundles will in fact be infinite. The light ray bundles P1', P2', and P3' may be exit ray bundles from a projector system (as discussed in more detail below with respect to FIG. 6).

Ray bundle P2' exits an optical system (such as a projector) and is focused at the intermediate focal surface P'. Ray bundle P2' is known as an on-axis ray because it lies on the optical axis of the projector system. Rays bundles P1' and P3' do not lie at on the optical axis of the exit optical system and are therefore off-axis. Ray bundle P2' is incident on, and diffracted from, the holographic device 300 and because ray bundle P2' is incident on the centre of the holographic device 300 (that is corresponding to the origin of FIG. 4*a*) no additional curvature will be introduced. Ray bundle P2' intersects at point 2' at the eye plane of the user. However, for ray bundles such as P1' and P3', incident on the periphery of the holographic device 300 a significant additional tilt will be introduced (that is corresponding to the maximum focus shift). The ray bundles P1' and P3' are diffracted by the holographic device 300 such that they are not incident on a single point P2'. Ray bundles P1' and P3' instead intersect at respective points 1' and 3' at the eye plane of the user (and are said to be focused at infinity, that is collimated). The spread of points 1', 2', 3' at the eye plane is caused by the tilted wavefront and causes the individual ray bundles P1' and P3' to be imaged at respective points 1' and 3' at the eye plane above point 2'. It should be noted that points 1', 2' and 3' are spread across the eye plane of the user, however there may be a small amount of overlap between adjacent points. This results in eye box discrete spread spots and for the holographic device 300 and results in no variation of focus for each point P1', P2', P3' at the eye plane, thus resulting in uniform resolution across the diffracted image. For clarity and understanding a front on view of the eye box, that is as seen from a user's or viewers perspective at the eye plane, is illustrated in FIG. 5*b*. This represents the front on view corresponding to the side view of FIG. 5*a*.

With reference to FIGS. 5*a* and 5*b*, the holographic device 300 according to embodiments diffracts light such that that rays at the periphery, that is, away from the central axis P2' (ray bundles P1', and P3') appear as separated or points 1', 2' and 3' and they are formed at the eye box plane at the side furthest from the projector. In other words, the points are formed at one side of the central axis and as illustrated in FIG. 5*a*, they are formed above the central point 2', formed by ray bundle P2'. This is due to the phase profile in the hologram pattern of the holographic device 300.

When in use, in for example a VRD, as discussed in more detail below, the holographic device 300 causes pupil aberrations. The hologram device 300 makes an image of the exit pupil of the projector system aberrated with the coma. The image generated by a projector system may focused at infinity, while the exit pupil of the projector system is aberrated at the eye plane. That is, the eye box at the eye plane is a coma aberrated image of an exit pupil of an optical system (such as the exit pupil of the projector system where the exit pupil of the projector system is relayed into discrete and separate coma aberrated eye boxes). The coma introduced by the holographic optical element 300 thus deliberately compensates or corrects image aberrations at the expense of pupil aberrations. In this way, the skilled person will see that the holographic device 300 according to embodiments achieves equalised focus between different fields of view at the eye plane at the expense of spreading out the eye box. Whilst the image generated by a projector system may be focused at infinity, the principles of the present disclosure may be applied to different focal distances across the field of view, such as 1 m (meter), depending on the specific AR system design. Typically, smart glass applications require a focal distance of 1 m, whereas head up displays require a focal distance of infinity.

The holographic device 300 according to embodiments may be formed by any appropriate holographic processes. The skilled person will appreciate that standard holographic techniques may be used for forming the hologram element 304 on the substrate. Specifically, the interference pattern used to form the hologram element 304 is created by two beams, referred as a reference beam and an object beam and the interference pattern is the recorded on the hologram element 304. The hologram element 304 is formed on the substrate 302 by coating or laminating an appropriate holographic material on the substrate 302. The skilled person will appreciate that any appropriate holographic material may be used, for example photopolymers or silver halide, to form or record a desired holographic pattern or interference pattern on the substrate 302.

A further advantage of the holographic device 300 according to embodiments is that it can be utilised with projector systems without having to change the design of the projector systems. The coma of the holographic device 300 is simply optimised for the specific optical design of the projector system.

The skilled person will appreciate that the holographic device 300 according to embodiments may be suitable for use in any number of optical applications. Such applications include but are not limited to VRDs, lenses of smart glasses, such smart glasses used in conjunction with VRDs, smart glasses with eye-tracking or head up displays (HUDs).

The holographic device 300 may be embedded in one or both lenses of a pair of smart glasses. By way of non-limiting example, the lamination process may include the following steps. The holographic device 300 may be a thin film of the same size and profile of the lenses. The thin film may be laminated between a first component part of a lens and a second component of a lens. The first component part and the second component part are then attached to each other, such that the thin film is entirely encapsulated within the lens or lenses. Likewise, the thin film may be laminated directly onto the outer surface of one or both of the lenses. Alternatively, the substrate 302 of the holographic device 300 may also function as a lens or lenses of a pair of smart glasses. The skilled person will therefore appreciate any appropriate embedding or lamination process may be used without departing from the scope of the inventive concept.

Figure 6:
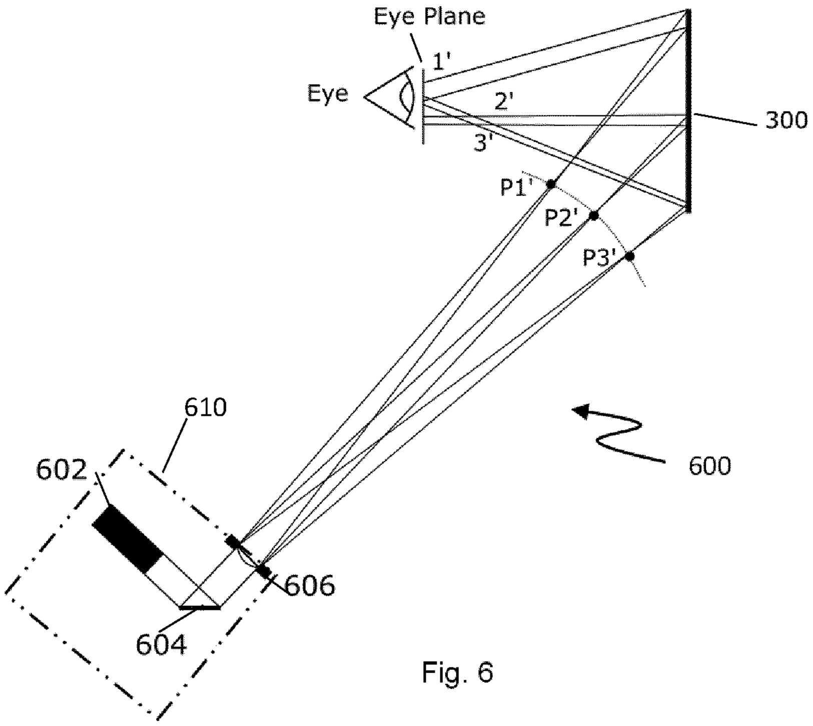
FIG. 6 illustrates a schematic virtual retinal display comprising the holographic device, according to an embodiments, in conjunction with a projector system.

The holographic device 300 may be used in conjunction with a VRD an example of which is illustrated in FIG. 6. The VRD 600 may comprise any suitable light source or sources 602, such as an array of RGB lasers. One or more tip and tilt mirrors 604, such as MEMS mirrors, may be included to scan or raster light from the light source 602 via an exit pupil 606 onto a holographic device 300 according to embodiments. The light source 602, MEMS scanning mirrors 604 and exit pupil 606 are generally described as a projector 610.

The eye plane may orientated normally with respect to a central ray bundle of light source 602 diffracted from the central portion of the holographic element.

Light incident on the holographic device 300, is thus diffracted in accordance with the principles set out above, to form the eye box as illustrated in FIGS. 5*a* and 5*b*. This results in identical focus of rays from the light source 602 at the eye plane for each field of view.

In the context of the present application and optical systems as a whole, the skilled person will appreciate that the exit pupil of the projector system 610 may be real or virtual. An exit pupil may be defined an aperture in an optical where only rays which pass through this aperture can exit the system. In the sense that it is real it may be a lens, aperture or other suitable optical components. Virtual pupils may be generated by other refractive components.

As mentioned above the holographic device 300 according to embodiments may be incorporated in or on one or more lenses of a pair of smart glasses. A VRD 600 of the type described above may be included on a frame of the smart glasses. Typically, the VRD 600 is placed one arm of the smart glasses and light from the VRD 600 is directed to one of the lenses incorporating the holographic device 300. The holographic device 300 according to embodiments redirects light from the VRD onto the eye plane and when in use an image can then be viewed by a wearer or user of the glasses. The cubic phase profile is preferably implemented, for example in smart glasses, such that a projector system is directionally orientated, with respect to the holographic device 300.

Known point-to-point holographic elements can be multiplexed to generate multiple eye boxes in the form of an array. Similarly, the holographic device 300 can be multiplexed to generate an array of eye boxes. Where multiple eye boxes are generated eye tracking may be used to select a specific eye box for viewing by a user. In terms of operation, light from the VRD 600 is directed onto the holographic device 300 into the eye of the user, forming an array of distinct eye boxes at the eye plane as mentioned above. Images observed at different eye boxes can be registered or superimposed through eye tracking techniques. For example, optical eye tracking head-mounted systems typically have an infrared (IR) light source to illuminate the eye and an IR camera (for example, a Charge Coupled Device, CCD) to capture an image of the eye and track the position of the eye. The IR camera and the IR light source may be mounted near the eye a head-mounted structure, for instance the frame of a pair of smart glasses. Machine vision algorithms can then determine the position of the corneal reflection from the light source, also called a glint or first Purkinje image or spot, and the position of the pupil. This allows specific eye boxes to be imaged and viewed by the user. The skilled person will however appreciate any appropriate eye tracking technique, such as optical eye tracking (as described); eye-attached tracking; or electric potential measurement may be used without departing from the scope of the inventive concept.

Particular and preferred aspects of the disclosure are set out in the accompanying independent claims. Combinations of features from the dependent and/or independent claims may be combined as appropriate and not merely as set out in the claims.

The scope of the present disclosure includes any novel feature or combination of features disclosed therein either explicitly or implicitly or any generalisation thereof irrespective of whether or not it relates to the claimed disclosure or mitigate against any or all of the problems addressed by the present disclosure. The applicant hereby gives notice that new claims may be formulated to such features during prosecution of this application or of any such further application derived therefrom. In particular, with reference to the appended claims, features from dependent claims may be combined with those of the independent claims and features from respective independent claims may be combined in any appropriate manner and not merely in specific combinations enumerated in the claims.

Features which are described in the context of separate embodiments may also be provided in combination in a single embodiment. Conversely, various features which are, for brevity, described in the context of a single embodiment, may also be provided separately or in any suitable sub combination.

The term “comprising” does not exclude other elements or steps, the term “a” or “an” does not exclude a plurality. Reference signs in the claims shall not be construed as limiting the scope of the claims.

The invention claimed is:

1. A holographic device for a virtual retinal display, the holographic device comprising:

a substrate; and a holographic element arranged on said substrate;

wherein the holographic element comprises a phase pattern and said phase pattern contains a predefined optical coma configured and arranged to diffract light from a light source to generate an eye box at an eye plane of the holographic element, wherein the optical coma is represented as a cubic function in a phase profile across a transverse axis of the holographic element.

2. The holographic device of claim 1, wherein said eye box is a coma aberrated image of said light source.

3. The holographic device of claim 1, wherein said transverse axis extends through a central portion of the holographic element between first and second distal edges of the holographic element.

4. The holographic device of claim 3, wherein the optical coma increases from the central portion of the holographic element toward said first and second distal sides of the holographic element, and wherein the optical coma is antisymmetrical about a central axis.

5. The holographic device of claim 3, wherein the holographic element has a local optical focusing power that increases from the central portion of the holographic element towards the first distal side; and the local focusing power decreases from the centre portion towards the second distal side.

6. The holographic device of claim 5, wherein the local optical focusing power of the holographic element is substantially zero at the central portion and wherein the local optical focusing power varies substantially linearly across the width of the holographic element.

7. The holographic device of claim 1, wherein the eye plane is orientated normally with respect to a central ray of said light source diffracted from the central portion of the holographic element.

8. A holographic device for a virtual retinal display, the holographic device comprising:

a substrate; and a holographic element arranged on said substrate;

wherein the holographic element comprises a phase pattern and said phase pattern contains a predefined optical coma configured and arranged to diffract light from a light source to generate an eye box at an eye plane of the holographic element, wherein the optical coma of the holographic element is configured and arranged to form an array of eye boxes at said eye plane.

9. The holographic device of claim 8, wherein the array of discrete eye boxes is a two-dimensional array of eye-boxes at said eye plane.

10. A method of forming a holographic device for a virtual retinal display system, the method comprising: forming a holographic element on a substrate, wherein the holographic element comprises a phase pattern and a phase pattern that contains a predefined optical coma configured and arranged to diffract light from a light source to generate an eye box at an eye plane of the holographic element, and said eye box is a coma aberrated image of said light source, where the optical coma is represented as a cubic function in the phase profile across a transverse axis of the holographic element.

11. The method of claim 10, wherein the optical coma of the holographic element is configured and arranged to form an array of discrete eye boxes at said eye plane.

12. The method of claim 11, wherein the array of discrete eye boxes is a two dimensional array of eye-boxes at said eye plane.

13. The method of claim 10, wherein the holographic element is formed by the interference of an object beam and a reference beam to define the optical coma.

14. The method of claim 10, wherein said substrate is formed of a transparent material selected from the group consisting of: glass, polycarbonate plastic, and acrylic plastic.

15. The method of claim 14, wherein said substrate is curved or planar.

16. The method of claim 10, wherein the holographic element is formed of a photopolymer or silver halide.

* * * * *